(12) United States Patent
Bloom

(10) Patent No.: US 7,354,887 B2
(45) Date of Patent: Apr. 8, 2008

(54) HIGH TEMPERATURE LCP FOR WEAR RESISTANCE

(75) Inventor: Joy Sawyer Bloom, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/659,168

(22) Filed: Sep. 10, 2003

(65) Prior Publication Data

US 2004/0121088 A1    Jun. 24, 2004

Related U.S. Application Data

(60) Provisional application No. 60/434,621, filed on Dec. 18, 2002.

(51) Int. Cl.
*F16C 33/20* (2006.01)

(52) U.S. Cl. .................. 508/100; 508/109; 252/299.01

(58) Field of Classification Search ........... 252/299.01; 524/404, 445, 449, 495; 508/107–109, 100
See application file for complete search history.

(56) References Cited

U.S. PATENT DOCUMENTS

| | | | |
|---|---|---|---|
| 3,179,614 A | | 4/1965 | Edwards |
| 4,048,375 A * | | 9/1977 | Loewenberg et al. .... 428/475.2 |
| 4,439,578 A * | | 3/1984 | Kim et al. ................. 524/538 |
| 4,851,497 A * | | 7/1989 | Wakui et al. .............. 528/176 |
| 4,889,886 A * | | 12/1989 | Wada et al. ............... 524/449 |
| 4,891,418 A * | | 1/1990 | Hara et al. ................ 528/195 |
| 5,004,497 A | | 4/1991 | Shibata et al. |
| 5,079,289 A * | | 1/1992 | Layton et al. ............. 524/600 |
| 5,216,092 A * | | 6/1993 | Huspeni et al. ........... 525/444 |
| 5,294,654 A * | | 3/1994 | Hellstern-Burnell et al. ............ 524/127 |
| 5,312,866 A * | | 5/1994 | Tsutsumi et al. .......... 524/600 |
| 5,470,922 A | | 11/1995 | Kaku et al. |
| 5,767,223 A * | | 6/1998 | Yamada et al. ............ 528/193 |
| 5,789,523 A * | | 8/1998 | George et al. ............ 528/170 |
| 5,844,036 A * | | 12/1998 | Hughes ..................... 524/494 |
| 5,969,083 A * | | 10/1999 | Long et al. ............... 528/194 |
| 6,027,771 A * | | 2/2000 | Moriya ....................... 428/1.6 |
| 6,130,190 A * | | 10/2000 | Gunsel et al. ............. 508/204 |
| 6,255,260 B1* | | 7/2001 | Stork ......................... 508/421 |
| 6,348,163 B1* | | 2/2002 | Long et al. ............ 252/299.01 |
| 6,432,323 B1* | | 8/2002 | Maeda et al. .......... 252/299.01 |
| 6,755,992 B2* | | 6/2004 | Okamoto et al. ...... 252/299.67 |
| 7,125,499 B2* | | 10/2006 | Ferguson et al. ...... 252/299.01 |
| 7,235,514 B2* | | 6/2007 | Mack et al. ............... 508/100 |
| 2003/0001139 A1 | | 1/2003 | Nagano et al. |

FOREIGN PATENT DOCUMENTS

| | | |
|---|---|---|
| DE | 102 13 561 | 10/2002 |
| EP | 271 326 | 6/1988 |
| EP | 406 941 A2 | 1/1991 |
| EP | 430 640 A1 | 6/1991 |
| EP | 1 314 760 A1 | 5/2003 |

OTHER PUBLICATIONS

Polymer Science Dictionary, 2nd Edition, p. 307, Alger, 1997.*
Dainichi Nippon Cables LTD, Derwent Abstract 1988-066491 of JP 63017964A, Jan. 25, 1988.*

* cited by examiner

*Primary Examiner*—Rena Dye
*Assistant Examiner*—Sow-Fun Hon
(74) *Attorney, Agent, or Firm*—Chyrrea J. Sebree

(57) ABSTRACT

A high temperature liquid crystalline polyester (LCP) composition, and articles made therefrom, that provides "good" to "excellent" wear resistance at PVs (pressure×velocity) of at least 1.75 MPa-m/s (50,000 psi-fpm). The high temperature LCP being a matrix material containing lubricating fillers and having an onset of melting temperature of at least 320° C.

2 Claims, No Drawings

HIGH TEMPERATURE LCP FOR WEAR RESISTANCE

This application claims the benefit of U.S. Provisional Application No. 60/434,261 filed Dec. 18, 2002 which is incorporated by reference herein for all purposes as if fully set forth.

FIELD OF THE INVENTION

The present invention relates to a polyester composition and article having high wear resistance. More particularly, the present invention relates to high temperature liquid crystalline polymers (LCPs) containing lubricating fillers for good to excellent wear resistance.

BACKGROUND OF THE INVENTION

Liquid crystalline polymers (LCPs) are used in a variety of applications including molding resins. LCPs are used in a variety of applications because they have desirable (combination of) properties that other polymers have been unable to match. Many LCPs have good high temperature properties that are useful, for example from 250° C. to about 320° C. Some LCPs have claimed to be useful at higher temperatures but these have often had other drawbacks, such as poor processability, poor dimensional stability and/or poor thermal stability at their melt processing and/or use temperatures. Thus, LCPs with improved high temperature properties such as dimensional stability are of interest. Hence, it is desirable to have high temperature LCPs with good to excellent wear resistance at elevated PVs (pressure×velocity).

The following disclosures may be relevant to various aspects of the present invention and may be briefly summarized as follows:

U.S. Pat. No. 5,789,523 to George et al. discloses polyimide compositions that can be substantially improved by incorporating into the composition an inorganic, low hardness, thermally stable, sheet silicate, such as muscovite mica, talc and kaolinite, which results in improved wear resistance and reduced coefficient of friction. This patent discloses a blend material and does not disclose particulate polyimide.

U.S. Pat. No. 5,470,922 to Kaku et al. discloses polymeric blends of polyimide precursor resins and polyamides or polyesters, preferably in the form of liquid crystal polymers, provide polyimide products with excellent physical characteristics and injection molding capability. This patent does not disclose high temperature LCPs.

U.S. Pat. No. 5,312,866 to Tsutsumi et al. discloses a molding resin composition comprising 99.9 to 50% by weight of polyimide material and 0.1 to 50% by weight of PEK (polyether ketone) resin and/or polyester resin, and more particularly comprising the polyester resin capable of forming an anistropical molten phase at a temperature of 420° C. or less and a polyimide-based molding resin composition which comprises the said resins and other additives such as phenolic resin, fluororesin, graphite, carbon fibers, aromatic polyamide fibers, potassium titanate fibers and a crystallization accelerator, and is excellent in thermal resistance, chemical resistance, mechanical strength and processability.

U.S. Pat. No. 5,004,497 to Shibata et al. discloses a friction material containing 0.85 to 30 weight % carbon fibers and 2 to 20 weight % of aramid fibers. This friction material offers advantages in high temperature stability of the coefficient of friction, a favorable wear property, freedom from sticking and uneven wears, and superior anti-fade properties. This patent discloses a thermoset matrix material.

SUMMARY OF THE INVENTION

Briefly stated, and in accordance with one aspect of the present invention, there is provided a composition comprising a liquid crystalline polyester (LCP) as a matrix material having an onset of melting temperature of greater than 320° C. containing at least two lubricating fillers, wherein said composition having an onset of melting temperature of at least 320° C. and wear resistance of at least 1.75 MPa-m/s (50,000 psi-fpm).

Pursuant to another aspect of the present invention, there is provided an article made from composition comprising a liquid crystalline polyester (LCP) as a matrix material having an onset of melting temperature of greater than 320° C. containing at least two lubricating fillers, wherein said composition having an onset of melting temperature of at least 320° C. and wear resistance of at least 1.75 MPa-m/s (50,000 psi-fpm).

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE INVENTION

In the present invention, high temperature liquid crystalline polymers (LCPs) containing lubricating fillers are able to maintain "good" to "excellent" wear resistance at PVs of at least 1.75 MPa. For purposes of this application, those LCPs having an onset of melting temperature of at least 320° C. are considered high temperature LCPs. Additionally, for purposes of this application, the following Chart 1 defines the classifications of wear resistance (e.g. "good", "excellent", etc.) in terms of Wear Factor:

CHART 1

| Wear Resistance Classification | Wear Factor (cc-s/m-kg-hr) × $10^{-6}$ |
|---|---|
| Excellent | Less than 50 |
| Good to Moderate | Less than 100 |
| Marginal | 100-120 |
| Unacceptable | Greater than 120 |

The lubricating fillers for use in the present invention include graphite, carbon fiber, fluoropolymer, molybdenum disulfide, mica, talc, zinc oxide, tungsten carbide, silicone, carbon black, particulate polyimide, boron nitride, aramid, potassium titanate, barium titanate, and polytetrafluoroethylene (PTFE), and combinations thereof.

A wide variety of polyimides are suitable for use according to the invention, including those described in U.S. Pat. No. 3,179,614, the teachings of which are incorporated herein by reference. The polyimides described therein are prepared from at least one diamine and at least one anhydride. Preferred diamines, which can be used, include m-phenylene diamine (MPD), p-phenylene diamine (PPD), oxydianiline (ODA), methylene dianiline (MDA), and toluene diamine (TDA). Preferred anhydrides, which can be used to include benzophenone tetracarboxylic dianhydride (BTDA), biphenyl dianhydride (BPDA), trimellitic anhydride (TMA), pyromellitic dianhydride (PMDA), maleic anhydride (MA), and nadic anhydride (NA).

Preferred polyimides include those prepared from the following combinations of anhydride and diamine: BTDA-MPD, MA-MDA, BTDA-TDA-MPD, BTDA-MDA-NA, TMA-MPD & TMA-ODA, BPDA-ODA, BPDA-MPD, BPDA-PPD, BTDA-4,4'-diaminobenzophenone, and BTDA-bis(p-Phenoxy)-p,p'biphenyl. An especially satisfactory polyimide useful in the present invention is that prepared from pyromellitic dianhydride and 4,4'-oxydianiline (PMDA-ODA).

An embodiment of the present invention is the use of a polyester material as the matrix material. The polyester matrix material is preferably a liquid crystalline polymer (LCP), and most preferably an LCP having repeat units derived from 4-hydroxybenzoic acid, 4,'4-biphenol, terephthalic acid, and one or both of 2,6-naphthalenedicarboxylic acid and isophthalic acid.

An embodiment of the present invention is for the LCP matrix to contain two lubricating fillers as shown in Table 6. A preferable embodiment of the present invention is an LCP matrix material containing at least three lubricating fillers for good to excellent wear resistance as defined in Chart 1. An example of three lubricating fillers, but not limited to, in this embodiment includes the use of mica, graphite and carbon fiber in the LCP matrix material. A most preferred embodiment of the present invention contains four lubricating fillers in an LCP matrix for good to excellent wear resistance as defined in Chart 1. An example of four lubricating fillers, but not limited to, in this embodiment includes the use of mica, graphite, particulate polyimide and carbon fiber in the LCP matrix material.

Articles requiring good to excellent wear resistance are another embodiment of the present invention. Typical articles include, but are not limited to, bearings, gears, bushings and brush washers.

The present invention is further illustrated by the following Examples in which parts and percentages are by weight unless otherwise indicated. In the Examples wear specimens were prepared by machining test blocks of the composition described. A 6.35 mm (0.25") wide contact surface of a wear/friction test block was machined to such a curvature that it conformed to the outer circumference of a 35 mm (1.38") diameter×9.74 mm (0.34") wide metal mating ring. The blocks were oven dried and maintained over desiccant until tested.

EXAMPLES

The Tm (i.e. melting temperature) and the onset of melting temperature were determined using a 25° C./minute heating rate with either a DuPont Model 1090 Dual Sample Differential Scanning Calorimeter or a TA Instruments Model 2010 Differential Scanning Calorimeter by ASTM D3418. The LCP of the present invention having an onset melting point of at least 320° C. The melting point is taken as the peak of the melting endotherm on the second heat when measured by Differential Scanning Calorimetry.

TABLE 1

Onset of Melting and Tm

| LCP | Onset (° C.) | Tm (° C.) |
|---|---|---|
| Zenite ® 4000 | 250 | 323 |
| Zenite ® 6000 | 286 | 337 |
| Zenite ® 7000 | 285 | 348 |
| Zenite ® 9100 | 303 | 318 |
| Sumitomo ® E5000 | 332 | 399 |
| Xydar ® RC-210B | 351 | 407 |
| Zenite ® 9900HT | 364 | 434 |

In addition to the LCP materials in Table 1, Cypek® HT-M (manufactured by Cytec Industries, Inc.) was tested in order to provide a comparison of a non-LCP matrix material to an LCP matrix material, in the present invention. Cypek® HT-M is a polyether ketone ketone (PEKK) and has an onset of melting temperature of 334° C. and a Tm of 358° C.

Wear tests were performed using a Falex No. 1 Ring and Block Wear and Friction Tester. The equipment is described in ASTM Test Method D2714. After weighing, the dry block was mounted against the rotating metal ring and loaded against it with the selected test pressure. Rotational velocity of the ring was set at the desired speed. No lubricant was used between the mating surfaces. The rings were SAE 4620 steel, Rc 58-63, 6-12 RMS. A new ring was used for each test. Test time was 24 hours, except when friction and wear were high, in which case the test was terminated early. The friction force was recorded continuously. At the end of the test time, the block was dismounted, weighed and the wear calculated by the following calculation for Wear Factor:

Wear volume (cc-s/m-kg-hr)=weight loss (grams)/
(material density (g/cc)×test duration (hr)×load
(kg)×velocity (m/s)).

A low number is desired for Wear Factor and a low number or narrow range is desired for the Coefficient of Friction. Coefficient of Friction is preferably <0.20. When a sample is considered to have failed the wear test, melting of the sample is observed such that no usable weight loss can be calculated.

Example 1

In Example 1, sixty-five (65) Weight percent of a liquid crystalline polyester (Zenite® 9900HT manufactured by DuPont) was blended with 10 weight percent of 4767 synthetic graphite (manufactured by Asbury Graphite Mills, Inc.), 10 weight percent of Amoco VMX26 (i.e. manufactured by Amoco) milled carbon fiber, 5 weight percent of mica (Alsibronz 10 manufactured by Engelhard Corp.) and 10 weight percent of a particulate polyimide resin (e.g. Vespel® SP-1 manufactured by DuPont). The blending was accomplished using a 30-mm twin screw extruder with barrels set to 390° C. for zones 2 to 5, 385° C. for zones 6 to 9 and the die at 410° C. having vent ports in zones 4 and 8. Quenching was accomplished using a water spray. The strand was cut into pellets using a standard rotating blade cutter. The pellets were molded into standard 6.4 mm thick ASTM (D-638) tensile test bars using a 170 g capacity, 145-ton clamping pressure injection-molding machine. The profile was as follows: Rear 370° C., Center 400° C., Front 405° C. and Nozzle 405° C. The mold was set to 130° C. The injection conditions were Boost 1 sec, Injection 15 sec, Hold 15 sec, Injection Pressure 3.4 MPa, Ram Speed fast, Screw Speed 120 rpm and Back Pressure minimum. The samples were made into test specimens by machining. Wear testing was done at PV (pressure×velocity) as indicated in Table 2. The results of Sample No.1 show "excellent" wear resistance (see Chart 1). At a PV of 1.75 MPa-m/s (50,000 psi-fpm) the wear factor indicates "excellent" wear resistance. Even more surprising, is that at a PV of 3.5 MPa-m/s (100,000 psi-fpm) the wear factor still indicates "excellent" wear resistance (less than 50×10$^{-6}$ cc-s/m-kg-hr) for a matrix material of Zenite® 9900HT with an onset of melting temperature of 364° C. Normally at a PV of 3.5 MPa-m/s (100,000 psi-fpm), failure is expected due to the inability of the polymer to withstand thermal build up caused by the combination of frictional forces, load, and velocity and thus, melting occurs. It is believed the combination of the high temperature LCP with the lubricating fillers provide "excellent" wear resistance at this PV level.

TABLE 2

| Sample No. | PV (MPa-m/s) | Wear Factor (cc-s/m-kg-hr) × 10$^{-6}$ | Coefficient of Friction |
|---|---|---|---|
| 1 | 1.75 | 23.6 | 0.14 |
| 1 | 3.5 | 25.2 | 0.13 |

Example 2

In Example 2, sixty-five (65) weight percent of a liquid crystalline polyester (DuPont Zenite® 7000) was blended with 10 weight percent of 4767 synthetic graphite (Asbury), 10 weight percent of Amoco VMX26 milled carbon fiber (Amoco), 5 weight percent of mica (Alsibronz 10 (Engelhard)) and 10 weight percent of a particulate polyimide resin (DuPont Vespel® SP-1). The blending was accomplished using a 30-mm twin screw extruder with barrels set to 320° C. and the die at 335° C. having vent ports in zones 4 and 8. Quenching was accomplished using a water spray. The strand was cut into pellets using a standard rotating blade cutter. The pellets were molded into standard 6.4 mm thick ASTM (D638) tensile test bars using a 170 g capacity, 145-ton clamping pressure injection-molding machine. The profile was as follows: Rear 335° C., Center 340° C., Front 340° C. and Nozzle 345° C. Boost 1.5 sec, Injection 5 sec, Hold 15 sec, Injection Pressure 5.5 MPa, Ram Speed fast, Screw Speed 115 rpm and Back Pressure 0.3 MPa. The samples were made into test specimens by machining. Wear testing was done at PV (pressure×velocity) as indicated in Table 3.

In Table 3, Zenite® 7000 (DuPont) was used as the matrix material and showed "excellent" wear resistance at PVs of: 1.75 MPa-m/s (50,000 psi-fpm) and 2.63 MPa-m/s (75143 psi-fpm). However, at 3.5 MPA-m/s (100,000 psi-fpm) the sample melted. Zenite® 7000 (DuPont) has an onset temperature of 285° C., which is below that of high temperature LCPs of the present invention (i.e. 320° C.).

TABLE 3

| Sample No. | PV (MPa-m/s) | Wear Factor (cc-s/m-kg-hr) × 10$^{-6}$ | Coefficient of Friction |
|---|---|---|---|
| 2 | 1.75 | 30.7 | 0.07 |
| 2 | 2.63 | 27.4 | 0.075 |
| 2 | 3.5 | Melted | Melted |

Example 3

The same method of sample preparation, used in Example 1, was utilized in Example 3. Sixty-five (65) weight percent of a liquid crystalline polyester (E5000 manufactured by Sumitomo) was blended with 10 weight percent of 4767 synthetic graphite (Asbury), 10 weight percent of Amoco VMX26 milled carbon fiber (Amoco), 5 weight percent of mica (Alsibronz 10 (Engelhard)) and 10 weight percent of a particulate polyimide resin (DuPont Vespel® SP-1). Wear testing was done at PV (pressure×velocity) as indicated in Table 4. In Sample 3, the "excellent" wear resistance is maintained at 1.75 MPa-m/s and 3.5 MPa-m/s as in Example 1. The matrix material is Sumitomo E5000 and has an onset of melting temperature of 332° C. These results show that a matrix material with an onset of melting temperature of greater than 320° C. yields "excellent" wear resistance. It is further believed that the lubricating fillers in combination with the high temperature matrix material provide "excellent" wear resistance.

TABLE 4

| Sample No. | PV (MPa-m/s) | Wear Factor (cc-s/m-kg-hr) × 10$^{-6}$ | Coefficient of Friction |
|---|---|---|---|
| 3 | 1.75 | 23.6 | 0.092 |
| 3 | 3.5 | 28.4 | 0.092 |

Example 4

The same method for sample preparation used in Example 2 was also used in Example 4. Sixty-five 65 weight percent of the liquid crystalline polyester Zenite® 9100 (DuPont) was blended with 10 weight percent of 4767 synthetic graphite (Asbury), 10 weight percent of Amoco VMX26 milled carbon fiber (Amoco), 5 weight percent of mica (Alsibronz 10 (Engelhard)) and 10 weight percent of a particulate polyimide resin (Vespel® SP-1 (DuPont)). Wear testing was done at the PVs indicated in Table 5.

Sample 4, shows "good" wear resistance (see Chart 1) at 1.75 MPa-m/s and failure at 3.5 MPa-m/s. The matrix material has an onset melting temperature of 303° C., which is below the 320° C. of the present invention.

TABLE 5

| Sample No. | PV (MPa-m/s) | Wear Factor (cc-s/m-kg-hr) × 10$^{-6}$ | Coefficient of Friction |
|---|---|---|---|
| 4 | 1.75 | 51.8 | 0.21 |
| 4 | 3.5 | Melted | Melted |

Example 5

70 weight percent of Aurum® JCL-3010 resin (manufactured by Mitsui Chemical Co.) and 10 weight percent of Aurum® JCL-3030 resin (Mitsui) were blended with polymers using the same methodology as in Example 1. The Aurum® resins are self-lubricating, carbon fiber filled thermoplastic polyimides. This example shows a blended thermoplastic polyimide and LCP matrix material containing two lubricant filler materials one of which is carbon fiber. Wear testing was done at a PV of 3.5 MPa-m/s and the results are reported in Table 6.

The choices of LCP and the resins to blend are critical in obtaining desired wear resistance. This is shown by the results of Table 6. The wear testing was conducted at a PV of 3.5 MPa-m/s (100,000 psi-fpm) for the LCP materials listed in Table 6. Samples 7 and 8 show "excellent" wear resistance at this PV while the remainder of the samples in Table 6 failed. The LCPs blended in Samples 7 and 8 with Aurum® each had an onset of melting temperature above 320° C. Samples 5 and 6 failed and each of the materials blended with the Aurum® resin (Mitsui) had an onset of melting temperature below that of the present invention (<320° C.). Sample 9 shows that blending with a non-LCP having an onset of melting temperature of at least 320° C. is not adequate to achieve good to excellent wear resistance. The PEKK material in Sample 9 has an onset of melting temperature of 334° C.

The results show that the samples that failed could not handle the thermal and dimensional demands of the high PVs even in a high temperature matrix such as Aurum® resins (Mitsui) (~388° C. Tm). The use of a high temperature LCP with lubricating fillers achieves the desired wear resistance.

TABLE 6

| Sample No. | Liquid Crystalline Polyester | Wear Factor (cc-s/m-kg-hr) × $10^{-6}$ | Coefficient of Friction |
| --- | --- | --- | --- |
| 5 | Zenite ® 7000 | Melted | Melted |
| 6 | Zenite ® 9100 | Melted | Melted |
| 7 | Zenite ® 9900HT | 48.5 | 0.21 |
| 8 | Sumitomo ® E5000 | 38.6 | 0.13 |
| 9 | Cypek ® HT-M | Melted | Melted |

Example 6

The same method for sample preparation as used in Example 1 was utilized in Example 6. Seventy (70) weight percent of a liquid crystalline polyester (Sumitomo E5000) was blended with 10 weight percent of 4767 synthetic graphite (Asbury), 5 weight percent of Panex® 33MF milled carbon fiber (manufactured by Zoltek®) and 10 weight percent of mica (Alsibronz 10 (Engelhard)). Wear testing was done at the PV (pressure×velocity) indicated in Table 7. This sample provides an illustration showing that the matrix material having three fillers had "excellent" wear resistance at a PV of 1.75 MPa-m/s (50,000 psi-fpm).

TABLE 7

| Sample No. | PV (MPa-m/s) | Wear Factor (cc-s/m-kg-hr) × $10^{-6}$ | Coefficient of Friction |
| --- | --- | --- | --- |
| 10 | 1.75 | 30 | 0.14 |

It is therefore, apparent that there has been provided in accordance with the present invention, a high temperature liquid crystalline polyester composition that provides high wear resistance at PVs of at least 1.75 MPa-m/s (50,000 psi-fpm) that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A composition comprising a liquid crystalline polyester (LCP) as a matrix material having an onset of melting temperature of greater than 320° C., containing about 65% by weight of said liquid crystalline polyester having an onset of melting temperature of greater than 320° C. blended with four fillers wherein said fillers comprise: (A) about 10% by weight of graphite; (B) about 10% by weight of carbon fiber; (C) about 5% by weight of mica; and (D) about 10% by weight of particulate polyimide, and wherein said composition has an onset of melting temperature of at least 320° C. and good wear resistance at a PV (pressure×velocity) of at least 1.75 MPa-m/s (50,000 psi-fpm).

2. An article made from a composition according to claim 1.

* * * * *